Nov. 19, 1946.   E. H. BEISER ET AL   2,411,355
APPARATUS FOR TESTING AND ADJUSTING BAROMETRIC FUSES
Filed Aug. 23, 1943   3 Sheets-Sheet 1
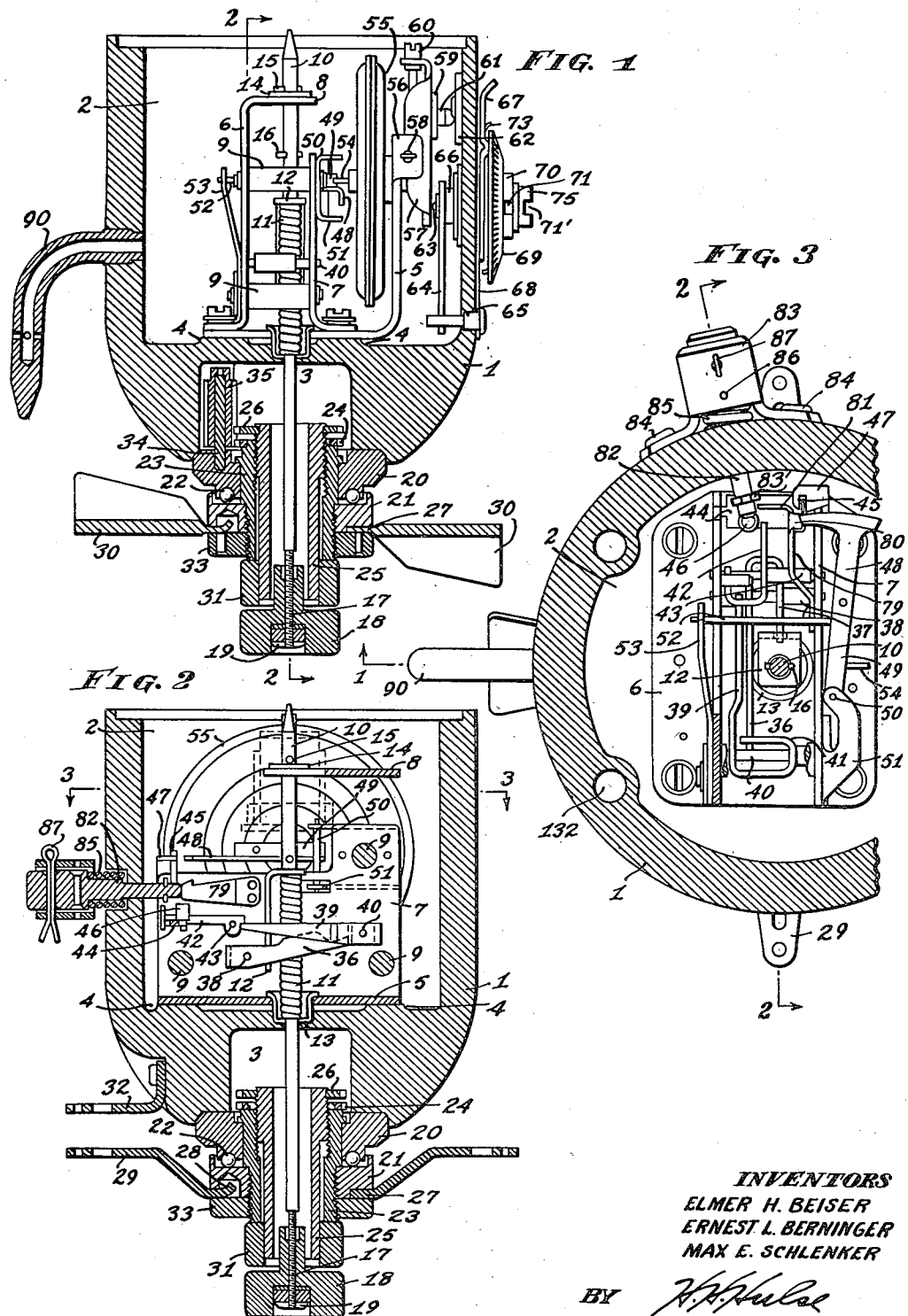
INVENTORS
ELMER H. BEISER
ERNEST L. BERNINGER
MAX E. SCHLENKER
BY
ATTORNEY Nov. 19, 1946.    E. H. BEISER ET AL    2,411,355
APPARATUS FOR TESTING AND ADJUSTING BAROMETRIC FUSES
Filed Aug. 23, 1943    3 Sheets-Sheet 2
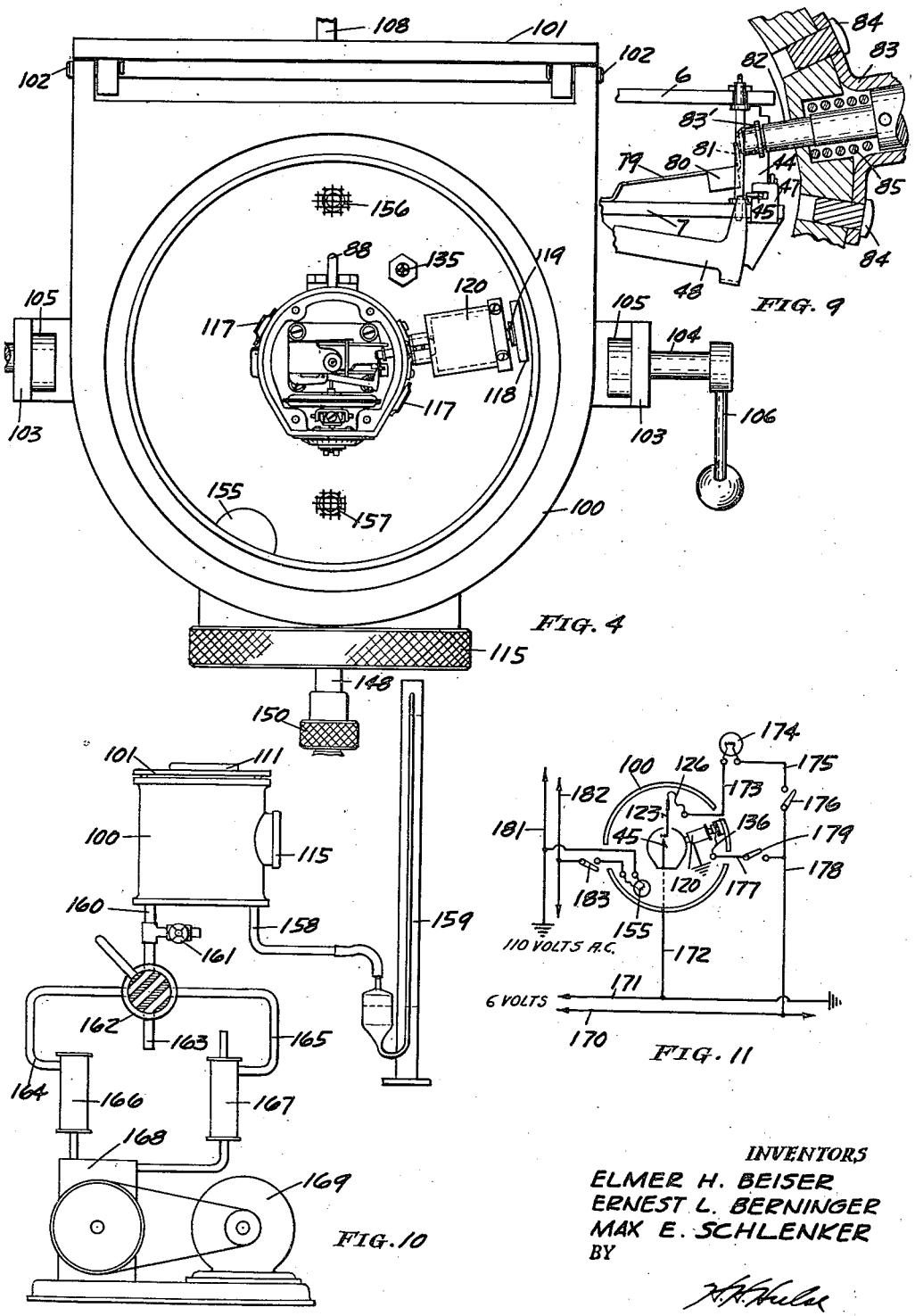
INVENTORS
ELMER H. BEISER
ERNEST L. BERNINGER
MAX E. SCHLENKER
BY
ATTORNEY.

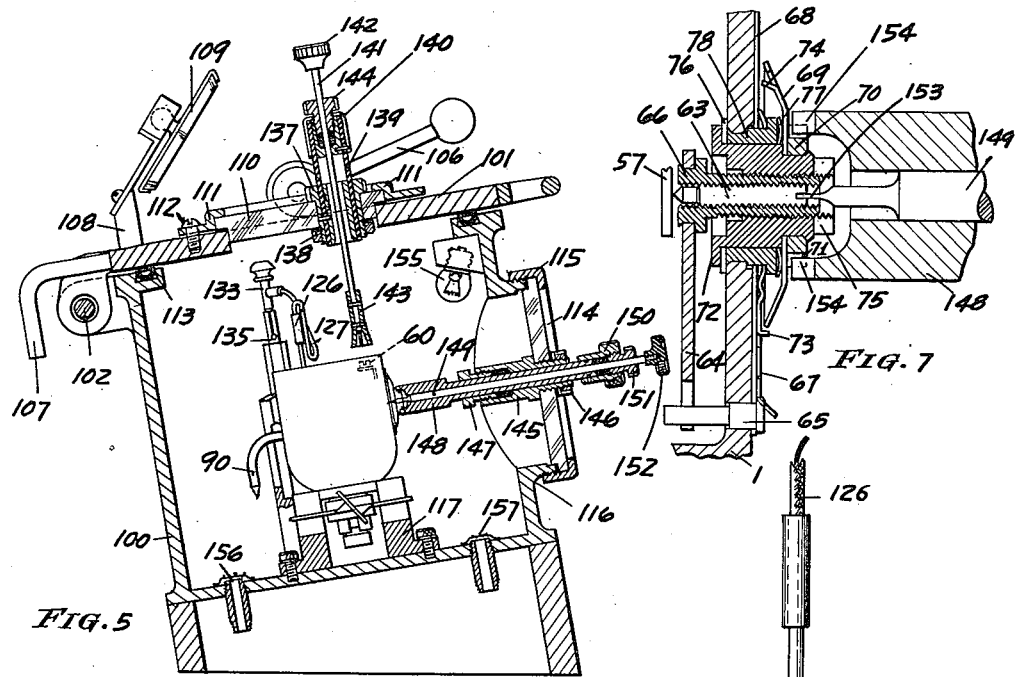
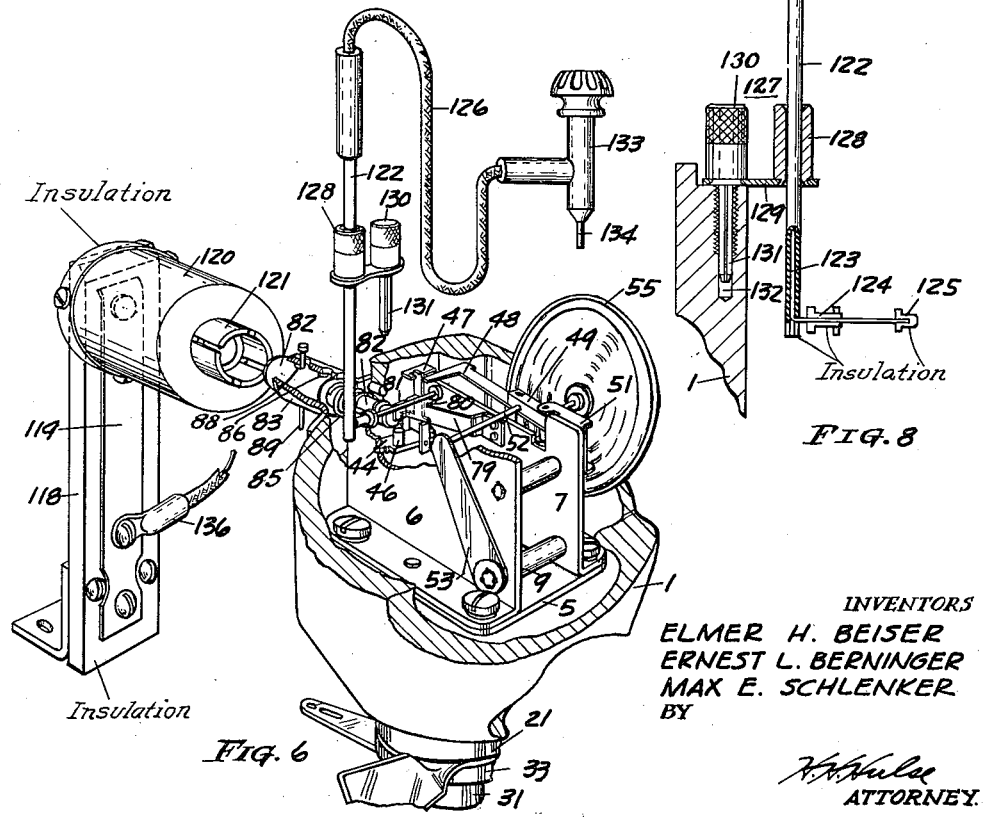

Patented Nov. 19, 1946

2,411,355

UNITED STATES PATENT OFFICE 2,411,355

APPARATUS FOR TESTING AND ADJUSTING BAROMETRIC FUSES

Elmer H. Beiser, Peru, Ernest L. Berninger, La Salle, and Max E. Schlenker, Peru, Ill., assignors to General Time Instruments Corporation, New York, N. Y., a corporation of Delaware Application August 23, 1943, Serial No. 499,610

14 Claims. (Cl. 73—5)

This invention relates to improvements in apparatus for testing and adjusting barometric bomb fuses. A barometric fuse is a device forming a part of a bomb which is designed to detonate or ignite the same when the falling bomb reaches a predetermined altitude. The operation of the fuse is controlled by an aneroid, or other pressure responsive device. The fuse, as manufactured at the present time, is provided with certain regulating mechanism, calibrated according to altitude, or barometric pressure, or both, whereby the altitude of detonation may be predetermined by the bombardier. Due to the fact that the characteristics of one aneroid will vary from the characteristics of another aneroid, it is necessary to adjust the regulating apparatus after the fuse has been assembled, so that the operation thereof will coincide with the calibrations on the regulating mechanism.

The testing apparatus which constitutes this invention comprises a testing chamber, together with means to control the air pressure within the chamber in such a manner as to simulate the atmospheric conditions encountered as a bomb drops from an airplane. The testing apparatus also embodies means extending through the wall of the chamber which engage various regulating screws on the fuse, disposed within the chamber, and adapted to be operated by the operator from the outside of the chamber.

In view of the fact that it is necessary to make a series of tests on a given fuse, it is an object of this invention to provide cooperating means, on both the fuse itself and on the testing apparatus, whereby the operation of the parts of the fuse may be indicated to the operator, and whereby the released parts after operation may be reset to their original unoperated position in preparation for another test. By such means it is possible to make a series of tests without removing the fuse from the testing chamber after each test for the purpose of resetting the same.

It is a further object of this invention to provide an improved testing and adjusting apparatus whereby all adjustments of the fuse, disposed within the testing chamber, may be made by the operator from the outside of the chamber.

This invention is shown as adapted to test a type of fuse, the parts of which when released cannot be reset without considerable difficulty. It is another object of this invention to provide testing apparatus which embodies blocking means to prevent the total release of the operating parts of the fuse, so that the resetting thereof may be readily accomplished.

It is still another object of this invention to provide improved means which serve not only to prevent the total release of the parts of the fuse, but which at the same time serve to indicate to the operator when that release takes place.

A still further object of this invention is to provide an improved electromagnetic means disposed within the chamber, which serves to reset the released parts of the fuse.

Other objects, features and advantages of this invention will become apparent as the description proceeds.

In the appended drawings, which form a part of this specification, and in which like reference numerals represent like parts—

Fig. 1 is a sectional elevation of a fuse of the type to be tested and adjusted by this invention;

Fig. 2 is a section along lines 2—2 of Figs. 1 and 3;

Fig. 3 is a section along line 3—3 of Fig. 2;

Fig. 4 is a plan view of a preferred form of the testing and adjusting apparatus which forms the subject of this invention, the apparatus being shown with its cover lifted;

Fig. 5 is a sectional elevation of the testing apparatus shown in Fig. 4;

Fig. 6 is an enlarged perspective view showing in detail the resetting and the blocking and part of the signal controlling devices;

Fig. 7 is an enlarged section showing a portion of the adjusting and regulating means;

Fig. 8 is an elevation, partially in section, of the combined blocking and signal control device;

Fig. 9 is a section showing in detail the resetting means;

Fig. 10 is a diagrammatic representation of the apparatus as a whole; and

Fig. 11 is a diagrammatic representation of the circuits embodied in the testing apparatus.

With reference now to Figs. 1, 2 and 3, in which the fuse itself is shown, the reference numeral 1 represents the body of the fuse, which is hollowed out to provide a main cavity 2 and a nose cavity 3. A plurality of bosses 4 is formed at the bottom of the main cavity 2, and an aneroid bracket 5, together with a rear plate 6 and a front plate 7, is mounted on these bosses by means of suitable screws. The plates 6 and 7 are maintained in spaced relationship by pillars 9.

The rear plate 6 embodies a bent over extension 8 which serves as a guide for the pointed end of a firing pin 10, the other end of which firing pin passes through the body 1 and extends into the cavity 3. A coiled spring 11 surrounds the firing pin and is confined between the bent over end of a latch 12 at its upper end and a spring cup 13 at its lower end. The spring cup seats in the aneroid bracket 5. The firing pin is slidably mounted with respect to the latch 12 and the spring cup 13, and is provided with pins 15 and 16 which serve to limit its motion. The normal unoperated position of the firing pin is shown in Figs. 1 and 2, and is determined by the engagement of the pin 15 with the bent over extension 8, a washer 14 being interposed between the two. It will be seen that when the latch 12 is released, the spring 11 will throw the latch upwardly, the latch engaging the pin 16 and causing the firing pin as a whole to be moved upwardly to detonate the bomb.

A striker 18 is secured to the lower portion of the firing pin 10, which lower portion is threaded as indicated by the reference numeral 17, by a lock nut 19. It will be seen that irrespective of the operation of the fuse mechanism itself, displacement of the striker 18 by the impact of the falling bomb, will throw the firing pin upwardly, thereby detonating the bomb.

A safety block 31 is interposed between the striker 18 and certain additional mechanism hereinafter described, to prevent accidental displacement of the striker until such time as the bomb has fallen clear of the plane. The mechanism to release this safety block comprises an upper ball race 20, which is secured to the nose of the body 1 by means of a drive fit, and a lower ball race 21, together with ball bearings 22, so that the lower ball race may rotate freely with respect to the body. The lower ball race 21 is carried by a sleeve 23, onto which it is threaded, the sleeve 23 extending upwardly within the upper ball race 20, and being supported by a flange from the upper ball race so that it may rotate freely with respect thereto. A gear 24 is carried at the top of the sleeve 23.

An inner sleeve 25 is screw-threaded within the upper portion of the sleeve 23, and carries a gear 26 which is disposed immediately above the gear 24. The gear 26 is provided with one less tooth than the gear 24, and both mesh with a pinion 35, mounted on a pin 34 which is carried in the upper ball race 20. It will be seen that as the lower ball race is rotated in a clockwise direction (looking from the bottom), there will be a differential action between the gears 24 and 26, which will cause the inner sleeve 25 to be unscrewed from the sleeve 23, and to be shifted upwardly. A left-hand thread is provided between the inner and outer sleeves, 25 and 23, respectively, to accomplish this effect, and the pinion 35 is of sufficient length to mesh with the gears 24 and 26, even though they are separated.

A vane member 27 is suitably secured to a vane ring 33, which is threaded onto the lower portion of the sleeve 23, and is provided with a projection 28 which is adapted to interlock with the corresponding recess in the lower ball race 21. The vane member also includes two vanes 30, and two arming wire projections 29. An arming wire guard 32 is attached to the body 1 of the fuse so that the vane member 27 may be locked against rotation by means of a suitable arming wire (not shown) which passes through aligned apertures of the arming wire guard 32 and the arming wire projections 29 and through holes in the arming pin and sleeve as will be described later.

When this wire has been removed, and the bomb released, the falling of the bomb will cause the vanes 30 to rotate, thereby rotating the lower ball race 21 and causing the inner sleeve 25 to be elevated. The safety block 31 is in the form of a ring which fits over the lower portion of the inner sleeve 25. The wall of the ring is cut away at one portion so that when the inner sleeve has been elevated clear of the upper edge of the safety block 31, the safety block may be slid sidewise, the slot being of sufficient width to clear the upper reduced portion of the striker 18. In practice, the safety block is thrown to one side with great force at the time of release, due to the rotation of the parts with which it is associated. By means of this mechanism, it will be seen that after the bomb has dropped a predetermined distance, the safety block 31 will be automatically removed, the firing pin 10 then being free to detonate the bomb, either upon an impact of the striker or upon the release of the latch 12 by means hereinafter described.

The latch 12 is held in a position, wherein the coiled spring 11 is confined, by means of a system of levers comprising a latch lever 36, a second lever 39, a third lever 42, and a fourth lever 45. The latch 12 is provided with a slot, and a projection 37, as shown in Fig. 3, forming the short arm of the latch lever 36, engages the latch 12 in this slot. The latch lever 36 is mounted on an arbor 38, in the plates 6 and 7. The second lever 39 is mounted on an arbor 40 in the plates 6 and 7, the end 41 of this lever, forming its short arm, being folded back upon itself as shown in Fig. 3, and being engaged by the long arm of lever 36. The third lever 42 is mounted on an arbor 43, the short end of this lever being engaged by the long arm of lever 39, and the long arm of lever 42 engaging a rock plate 44, which rock plate is mounted in the plates 6 and 7. The fourth lever is mounted on the rock plate 44, and its upper end is received in a slotted lever guide 47 which is secured to the plate 7. A trip lever 48 is suitably mounted in a position to block the movement of the fourth lever 45, as will hereinafter appear. It will be seen that when the trip lever 48 is withdrawn from the fourth lever 45, the fourth lever will rock in the clockwise direction as shown in Fig. 2, thereby releasing the third lever 42, and the levers 39 and 36, as well as the latch 12. The firing pin will then be actuated by the spring 11, and the bomb detonated.

The ratio of this lever system is approximately 7500 to 1, and reduces the pressure of the firing pin spring 11, which is about 9½ pounds to about .02 of an ounce at the fourth lever. Thus it will be seen that very little drag is placed on the trip lever 48.

The trip lever 48 is carried on a support in the form of a block 49, as shown in Fig. 3, the block being mounted on an arbor 50 which is carried in a bracket 51 secured to the plate 7. A rod 52 extends between the block 49 and a leaf spring 53, the latter being mounted on the plate 6. It will thus be seen that the trip lever is biased away from the fourth lever 45.

A link pin 54 extends between the block 49 and an aneroid 55, the latter being mounted upon the aneroid bracket 5, which is somewhat resilient so that the aneroid as a whole may be displaced to the left, as viewed in Fig. 1, to urge the trip lever 48 into blocking position.

The aneroid bracket 5 is provided with turned-up ears 56, between which a lever 57 is mounted by means of an arbor 58 which is received in the ears 56. An adjustable fulcrum plate 59 is slidably mounted in a slotted portion of the lever 57, and is engaged by an adjusting screw 60. The adjusting screw also passes through the bent over end of lever 57, as shown in Fig. 1. Operation of the adjusting screw will cause the position of the fulcrum plate 59 to be shifted, as well as the position of a fulcrum point 61 which is carried thereon. The fulcrum point 61 bears against a hardened steel plate 62 secured to the wall of the body portion 1. A set screw 63, hereinafter described, projects inwardly from the wall of the body portion 1 and engages one end of the lever.

In operation, the fulcrum point 61 and the set screw 63 are fixed points so that as the bomb falls, the increased air pressure will contract the aneroid, with the result that the trip lever 48 is displaced to one side, thereby releasing the fourth lever and detonating the bomb.

Means are provided so that the bombardier can shift the position of the set screw 63, in order to determine the position at which the fourth lever 45 will be released. The set screw 63 is mounted in a longitudinally adjustable sleeve 66, which is also exteriorly threaded. One end of the sleeve 66 carries an arm 64, the end of which arm is slotted and engages a pin 65 in the body 1. This prevents any rotation of the sleeve 66, but does permit longitudinal movement thereof. The exterior screwthreads of the sleeve 66 cooperate with a rotatable, threaded dial bushing 72 so that as the latter is rotated, the sleeve and the set screw will be displaced. An altitude dial 69 is secured to the dial bushing 72 (Fig. 7) by means of a spanner ring 70, the ring and the bushing being staked to each other. Behind the altitude dial is disposed a fixed barometric dial 68, which may be riveted to the body 1. A rotatable arm 67, having a pointer 73 which is adapted to register with the altitude dial 69, is disposed between the two dials. The altitude dial has a projection 74 struck out from the surface which is adapted to engage a hump in the pointer 73 so that the dial cannot be rotated past a zero altitude setting for any particular pressure setting. The dial bushing 72 is rotatably mounted in a stationary bushing 78, and a washer 76 is disposed between them at their rear portions. A friction washer 77 is disposed between the altitude dial 69 and the stationary bushing 78 so that the altitude dial may maintain its setting. The forwardly extended end 75 of the dial bushing 72 is provided with a slot 71' so that the position of the altitude dial and set screw may be regulated as a unit by a screwdriver or coin to adjust the fuse to detonate at the desired altitude. The spanner ring 70 is also provided with oppositely disposed slots 71, to provide an alternative regulating means which is used in the testing apparatus hereinafter described.

The bombardier regulates the altitude at which the detonation is to take place by rotating the altitude dial as described above.

The calibrations on the barometric dial and the provision of the pointer merely facilitate the proper setting of the altitude dial. The barometric scale reads in inches of mercury. Instead of the dial bushing being provided with a pointer adjustable to the desired pressure on the barometric scale at which detonation is desired, it is provided with the altitude dial 69 having indicia representing the altitude in feet. The altitude above surface at which detonation is desired is cumulated to the altitude of the surface at that point to get the absolute altitude of detonation by first setting the pointer to the barometric pressure, at surface, of the point to be bombed, and then aligning the desired altitude calibration of the altitude dial with the pointer. In other words, the pointer merely facilitates the alignment of the altitude above surface with the altitude of the surface to give directly the absolute altitude, or pressure, of detonation.

Additional means, referred to as an arming pin assembly, are provided for blocking the fourth lever, said means comprising a blocking lever 79 mounted on plate 7, having a bent over lug 80 which engages the fourth lever, and a bent over lug 81 which is adapted to be engaged by an arming pin 82 to hold the blocking lever 79 in blocked position. The lever 79 is biased into unblocked position. The arming pin is of steel or other magnetic material, and is slidably disposed in a sleeve 83 secured by studs 84 to the body 1. A spring 85 surrounds the arming pin and is confined between a shoulder thereon and the body portion 1, so as to urge the arming pin outwardly to release the blocking lever 79. A split washer 83' surrounds and engages a groove in the arming pin 82 to prevent the withdrawal of the pin from the fuse. These parts are shown in detail in Fig. 9.

A hole 86 is provided through the pin 82 and sleeve 83 which is adapted to receive the arming wire previously mentioned. A second hole 88 through the pin and sleeve is provided and is adapted to receive a cotter pin 87 as shown in Fig. 2. During testing this cotter pin is replaced by a test pin 89 as shown in Fig. 6. When the parts are held in position by the test pin, as shown in Figs. 6 and 9, the lever 79 is unblocked, but the parts are held in such a manner that the magnetic pin 46 is disposed adjacent to the end of the arming pin 82 for a purpose hereinafter described.

A Pitot tube 90 is provided in the body 1 to afford communication between the cavity 2 and a point on the neutral pressure contour of the falling bomb. This is to insure that the air pressure in the cavity 2 is substantially the same as the atmospheric pressure at the particular altitude through which the bomb is falling.

The testing and adjusting apparatus as shown in Figs. 4 to 11, comprises a testing chamber 100 provided with a cover 101 hingedly mounted at 102. The chamber 100 is provided with brackets 103 at its opposite sides in which shafts 104 are journaled, the shafts carrying cams 105 and handles 106 so that the cover 101 may be locked in place in airtight relationship. A stop 107 is provided for the cover to support it in its open position when a fuse is placed within the chamber. A post 108, mounted on the cover 101, supports a mirror 109 so that the operator can view the contents of the chamber through a window 110. The window is held in place by a ring 111 and screws 112. A packing ring 113 is disposed between the cover and the chamber to maintain its gastight relationship.

A window 114 is also provided in the side walls of the testing chamber, this window being held in place by means of a ring 115 which is screwthreaded onto a boss 116 formed on the wall of the chamber.

The fuse to be tested is held in a fixed position by means of a holding jig 117. A lamp 155 is provided to illuminate the interior of the chamber.

A bracket 118, extending upwardly from the floor of the testing chamber, is provided with a contact strip 119 to which is secured a conductor 136 which leads to a source of power so that the contact strip may be energized. A removable electro-magnet 120, having a socket 121, is fitted over the sleeve 83 so that the pole piece of the electromagnet contacts the outer end of the arming pin 82. One terminal of the electromagnet is disposed at a point where it is contacted by the resilient contact strip 119 and the other terminal comprises a socket 121, so that the magnet 120 may be energized by direct current flowing through the conductor 136, strip 119, magnet 120, and the sleeve 83 which is grounded. Before fitting the magnet 120 over the sleeve 83, the cotter pin 87 is withdrawn and the testing pin 89 is inserted in place thereof so as to release the blocking lever 79. When the magnet is energized, the arming pin 82 in effect forms an extended pole piece and attracts the pin 46 so as to rock the rockplate 44. The fourth lever 45 is then retracted into the lever guide 47, and thereby permits the trip lever 48 to be moved over into blocked position. In effect, therefore, the de-energization of the electromagnet 120 has the effect of withdrawing the cotter pin 87, so as to arm the fuse, and the energization of the electromagnet has the effect of resetting the latch mechanism.

Means are provided to limit the motion of the fourth lever so that it will not release the remaining levers forming a part of the latching system, for the reason that all of the levers could not be reset without removing the fuse from the testing apparatus. These means also indicate when they are contacted by the fourth lever 45.

These means include an insulating tube 122 in which is disposed an L-shaped conductor 123, the laterally extending portion of the conductor being provided with insulating collars, or supports 124 and 125. These supports are adapted to fit into suitable notches or apertures in the plates 6 and 7, respectively, so that the conductor 123 will be disposed in the path of the fourth lever. A flexible conductor 126, to the end of which is attached a plug 133 having a contact point 134, is in circuit with the conductor 123. The plug 133 is adapted to fit into a socket 135 which is mounted on suitable means within the testing chamber, the socket being in circuit with a lamp 174 and with a suitable source of power so that the conductor 123 may be energized.

It will be seen that the conductor 123 not only serves to block the movement of the fourth lever, so that it can be reset by the action of the electromagnet 120, but it, together with the lamp 174, also indicates when the fourth lever has been released, the fourth lever being grounded and, therefore, in circuit with the other terminal of the power source, as will be pointed out hereinafter. In other words, a combination of the magnet 120 and the conductor 123, and their associated parts, provides means for indicating to the operator of the testing apparatus the release of the latching mechanism, and means for resetting the same and for indicating said resetting.

A guide, indicated generally by the reference numeral 127, is provided for holding the conductor 123 and its associated parts, said guide comprising a sleeve 128 and a pin 130 which are associated by means of a plate 129. The shank of the pin 130 is slotted as shown at 131, and fits in a suitable aperture 132 formed in the upper edge of the body 1 of the fuse. After the guide 127 has been attached to the fuse body, the position of the insulating tube 122 may be adjusted so that the insulating supports 124 and 125 may be properly positioned.

Means, operable by the operator from the exterior of the testing apparatus, are provided to engage the adjusting screw 60, so that proper adjustments may be made without removing the fuse from the apparatus. These means comprise a bushing 137 and a cooperating packing ring 138 which are disposed within a suitable aperture in the window 110. An insulating tube 139 is mounted in the bushing 137, the upper end thereof being provided with a suitable closure 140, including a packing plug 144. A screwdriver 141 is disposed within the insulating tube 139 and extends through the closure 140 in airtight relationship, the blade of the screwdriver being adapted to engage the adjusting screw 60. An apron 143 is provided at the blade end of the screwdriver to facilitate this engagement, and a knob 142 is provided at the exterior end of the screwdriver for manipulation of the same.

Similar means are provided for engaging the spanner ring 70 and the set screw 63, so that proper adjustments may be made by the operator without removing the fuse from the testing chamber. These means comprise a bushing 145 and a packing ring 146 which extend through a suitable opening of the window 114 in gastight relationship. A rotatable sleeve 148 is journaled in the bushing 145 and is provided with lugs 154 at its inner extremity which are adapted to engage the slots 71 in the spanner ring 70, this relationship being shown in greater detail in Fig. 7. A packing plug 147 is provided to prevent any leakage of air between the surfaces of the sleeve 148 and the bushing 145. The exterior end of the sleeve is provided with a knob 150 so that the operator may rotate the spanner ring 70 and its associated altitude dial 69 and dial bushing 72.

A screwdriver 149, the blade 153 of which engages the set screw 63, is disposed within the rotatable sleeve 148, and is provided with a manually actuated knob 152 at its outer end. A packing plug 151 is provided to prevent leakage of air between the inner surface of the sleeve 148 and the surface of the screwdriver 149. It will thus be seen that the set screw 63 may also be adjusted by the operator.

A screened outlet 157 is provided in the bottom of the testing chamber 100 and communicates by means of a conduit 158 with a manometer 159, as shown in Fig. 10. A screened outlet 156, in the bottom of the testing chamber, communicates by means of a conduit 160 with a three-way valve 162, by means of which the pressure within the chamber may be regulated. A suitable bleeder valve 161 may be provided for the conduit 160. A pump 168, driven by a motor 169 and having a low pressure chamber 166 and a high pressure chamber 167, is provided for causing the evacuation of the chamber 100 or for building up the pressure therein. Conduits 164 and 165 lead from the three-way valve 162 to the low pressure and high pressure chambers, respectively. It will be seen that when the valve is in the position shown in Fig. 10, the chamber 100 will be evacuated. When the desired low pressure is reached, the handle of the valve is thrown into its vertical, neutral position, whereby the pump 168 is disconnected from the chamber. By throwing the valve handle over beyond the vertical position, the pressure within the testing chamber may be built up to any desired degree.

The electrical circuits involving certain of the parts hereinbefore described, are shown diagrammatically in Fig. 11. A six volt, direct current power source is represented by the leads 170 and 171, the lead 171 being grounded, as is the testing chamber 100 and the fuse disposed within the testing chamber. The electromagnet 120 and its associated flexible conductor 136 are in circuit with the power lead 170 by means of a conductor 171, switch 179 and lead 178. When the switch 179 is closed, the magnet 120 will be energized, the return circuit to the lead 171 being through ground.

The conductor 123 and its associated flexible conductor 126 are in circuit with the power lead 170 by means of a conductor 173, lamp 174, lead 175, switch 176 and lead 178. When the switch 176 is closed, the lamp 174 will be energized, provided that the fourth lever 45 is in its released position, the return circuit from the fourth lever to the power conductor 171 being through ground.

It will be noted that the conductors 173 and 177 both extend through the wall of the testing chamber 100, and are insulated from the wall, which wall is grounded, as indicated by the lead 172.

A power source of 110 volts, alternating current, is provided for the lamp 155, this power source comprising leads 181 and 182. A switch 183 is provided to control the operation of the lamp.

The operation of the various parts and assemblies has been detailed above in connection with the description thereof. It will be seen that there are two factory adjustments to be made in the fuse, which factory adjustments are made by means of this invention. One of these is the adjustment of the set screw 63 so that for a given altitude, the release of the fourth lever 45 by the trip lever 48 will occur at the altitude indicated by dials 68 and 69. The other is the adjustment of the adjusting screw 60 which is adapted to adjust the ratio of displacement with respect to pressure which is given by the dials 68 and 69 so that it will be the same as the ratio present in the aneroid.

Although the apparatus is designed to operate with an aneroid having a displacement of approximately .002 inch per inch of mercury change in atmospheric pressure, it is obvious that there will be certain variations between one aneroid and the other. This is compensated for by rotation of the adjusting screw 60 which varies the ratio of the two lever arms of lever 57. This lever being a lever of the second class as far as regulation is concerned, the adjustment provided by the adjusting screw 60 is very sensitive.

In adjusting and testing the fuse the parts of which have already been set so that the trip lever 48 overlaps the fourth lever 45 by about one thirty-second of an inch at sea level, the testing pin 89 is first inserted, and the cotter pin 87 is withdrawn so that the lever 79 unblocks the fourth lever 45. The electromagnet 120 is then placed over the sleeve 83, thereby making ground contact, the pole piece being in contact with the arming pin 82. The guide 127 is then positioned in the hole 132, and the insulating supports 124 and 125 fitted in suitable notches so that the conductor 123 is in blocking position. Release of the fourth lever 45 will then be indicated by the lamp 174, the plug 133 having been inserted in the socket 135. The fuse is then set in the holding jig 117 in the testing chamber so that the spanner lugs 154 engage the slots 71 in the spanner ring 70, and the blade 153 engages the set screw 63.

The chamber is then closed, and the switch 183 is closed to turn on the lamp 155.

As an example of a typical series of tests, the valve 162 may be thrown to its evacuating position, and the switch 176 closed. When the manometer 159 reads 29.07 inches, throw the valve 162 to neutral position. Then set the barometric dial 68 to 29.9 inches, and the altitude dial 69 to 800 feet (representing an absolute altitude of about 900 feet above sea level). Then turn the set screw 63 counterclockwise until the fourth lever has been tripped, as indicated by the lighting of the lamp 174, the latter adjustment being effected by rotating the knob 152.

Then reset the latch by closing switch 179, and the lamp 174 will go off. Set the barometric dial 68 to 28 inches, and the altitude dial 69 to 5,000 feet (representing an absolute altitude of about 6,750 feet above sea level). Evacuate the chamber until the manometer reads 22 inches or less; open switch 179 and permit air to enter the chamber until the lamp 174 indicates tripping, or until the manometer reads about 23.2 inches, whichever occurs first.

If the latter occurs first, turn the adjusting screw 60, by means of the knob 142, in counterclockwise direction until the lamp 174 indicates tripping. The ratio of longitudinal displacement with respect to pressure on the part of the bracket 5 will then agree with the corresponding ratio for the particular aneroid. If the former occurs first, then turn the adjusting screw 60 in clockwise direction by a predetermined amount, depending upon the difference between the present manometer reading and 23.2 inches as shown by the dials. In the particular apparatus herein disclosed, this predetermined amount represents about half a turn of the adjusting screw 60 per tenth of an inch of mercury.

The operation can be repeated to check the adjustments as made.

Other check tests may be made at altitudes intermediate 900 feet and 6,750 feet, if desired. Tests may also be made for altitudes lower than the altitude of the testing apparatus by throwing the valve 162 over beyond neutral so as to build up a positive pressure within the testing chamber.

It will be noted that all rotatable adjusting devices, such as the sleeve 148, the screwdriver 149, and the screwdriver 141, are provided with packing glands and packing plugs so as to prevent leakage. The resetting and indicating devices are electrically operated so that no mechanical connection need be made to the wall of the chamber.

Although only a preferred embodiment of this invention has been described herein, it will be obvious that many modifications and changes may be made therein without departing from the spirit of this invention. This description is intended to be illustrative only, and the invention is to be limited only by the appended claims.

We claim:

1. A testing and adjusting apparatus for barometric bomb fuses having firing mechanism, latch means for holding said firing mechanism in cocked position, and pressure responsive releasing mechanism therefor including an adjusting screw, comprising a chamber, pressure controlling means therefor, a rotatably mounted screwdriver extending through the wall of said chamber in gastight relationship for engaging said adjusting screw in order that the operation of said pressure responsive releasing mechanism may be regulated at subatmospheric pressures, means for blocking said latch means so that only a part thereof is released by said pressure responsive releasing mechanism, and means to reset said part to latched position.

2. In combination with a barometric bomb fuse having latching means and pressure responsive releasing means therefor, a testing apparatus therefor including a chamber with means for regulating the pressure therein, a member disposed in the path of a part of said latching means and adapted to be contacted thereby when released, together with indicating means to indicate contact between said part and said member.

3. In combination with a barometric bomb fuse having latching means, an armature associated with said latching means, and pressure responsive releasing means therefor, testing apparatus including a fluid tight sealed chamber in which said fuse is disposed, means to regulate the pressure within said chamber to cause operation of said releasing means, a stop member for preventing complete release of said latching means, and electromagnetic means for operating said armature whereby said latching means is retracted into fully latched position.

4. In combination with a barometric bomb fuse having latching means and pressure responsive releasing means therefor, testing apparatus therefor including a chamber with means for regulating the pressure therein, a member disposed in the path of one member of said latching means and adapted to be contacted thereby when released by said pressure responsive means, and means for resetting said one member to latched position.

5. In combination with a barometric bomb fuse of the type having a tensioned firing pin, a latch therefor including a system of independently releasable levers held under tension, and pressure responsive tripping means associated with the last lever of said system, means for testing the operation of said pressure responsive tripping means comprising a chamber and means for regulating the pressure therein, a blocking member positioned in the path of said last lever and adapted to be engaged thereby after tripping thereof, but before it has moved into a position wherein any of the other of said levers is released, and means for resetting said last lever to latched position, whereby the operation of said pressure responsive tripping device may be successively tested without resetting said other independently releasable levers, and indicating means to indicate contact between said last lever and said blocking member.

6. In combination with a barometric bomb fuse of the type having a tensioned firing pin, a latch therefor including a system of independently releasable levers held under tension, and pressure responsive tripping means associated with the last lever of said system, means for testing the operation of said pressure responsive tripping means comprising a chamber and means for regulating the pressure therein, a blocking member positioned in the path of said last lever and adapted to be engaged thereby after tripping thereof, but before it has moved into a position wherein any of the other of said levers is released, and means to reset said last lever against the tension of said lever system whereby the operation of said pressure responsive tripping device may be successively tested without resetting said other independently releasable levers.

7. In combination with a barometric bomb fuse of the type having latched detonating means including a system of independently releasable levers held under tension, and pressure responsive tripping means associated with the last lever, means for testing the operation of said pressure responsive tripping means comprising a chamber in which said fuse is disposed and means for regulating the pressure within said chamber, a blocking member mounted on said fuse and positioned in the path of said last lever and adapted to be engaged thereby after tripping thereof, but before it has moved into a position wherein any of the other of said levers is released, said blocking member being insulated from the parts on which it is mounted, and an electric indicating circuit including said blocking member and said last lever whereby the operation of said pressure responsive tripping device may be indicated without releasing said other independent releasable levers.

8. In combination with a barometric bomb fuse of the type having latched detonating means including a system of independently releasable levers held under tension, and pressure responsive tripping means associated with the last lever of said system, means for testing the operation of said pressure responsive tripping means comprising blocking means positioned in the path of said last lever so as to be engaged thereby after tripping thereof, but before it has moved into a position wherein any of the other of said levers is released, means to reset said last lever against the tension of said lever system after tripping, a pressure chamber in which said fuse is disposed, and means to regulate the pressure therein so that successive tests of said pressure responsive tripping device may be made without removing said fuse from said pressure chamber.

9. A barometric bomb fuse of the type having latched detonating means including a system of releasable levers held under tension, pressure responsive tripping means associated with the last of said system of levers and means for regulating the operation of said tripping means, in combination with means for testing successively the operation of said pressure responsive tripping means at different pressures comprising blocking means positioned in the path of said last lever and adapted to be engaged thereby after tripping thereof, but before it has moved into a position wherein any of the other of said levers is released, indicating means to indicate contact between said last lever and said blocking means, means to reset said last lever against the tension of said lever system, a pressure chamber in which said fuse is disposed, adjusting means extending through the wall of said chamber and engaging said regulating means, and means to regulate the pressure in said chamber so that successive tests of said pressure responsive tripping device may be made without removing said fuse from said pressure chamber.

10. In combination with a barometric fuse of the type having a tensioned latch lever and pressure responsive releasing means therefor, an airtight testing chamber, an electric conductor extending through the wall thereof and insulated therefrom, electrical indicating means and one terminal of a source of power in circuit with the external terminal of said conductor, the internal terminal of said conductor comprising a socket, a removable plug for said socket, a removable contact member mounted on said fuse and insulated therefrom, and adapted to be engaged by said latch lever when released, a flexible conductor in circuit with said contact member and said plug, said latch lever and the other terminal of said power source being grounded.

11. In combination with a barometric fuse of the type having tensioned latching means, a releasable lever for controlling said latching means adapted to be tripped, and blocking means therefor, said blocking means including an arming pin of magnetic material, capable of assuming a blocking position and a non-blocking position, an armature associated with said lever disposed near said arming pin when in unblocked position, a second blocking means for limiting the movement of said lever when tripped, and an electromagnet having a pole piece in contact with said arming pin, whereby said armature may be attracted to reset said lever after release thereof to said second blocking means.

12. In combination with a barometric bomb fuse having latching means, a releasing lever controlling said latching means, pressure responsive releasing means therefor, and blocking means for said lever including an arming pin of magnetic material capable of assuming a blocking position and a non-blocking position, a testing apparatus therefor including a member disposed in the path of said lever and adapted to be contacted thereby when released, indicating means to indicate contact between said lever and said member, an armature associated with said lever and disposed near said arming pin when in unblocked position, and electromagnetic means cooperating with said armature for breaking said contact and for retracting said lever into a position wherein it may again be engaged by said releasing means.

13. A testing apparatus for a barometric fuse of the type having latched detonating means, a releasable lever therefor and pressure responsive tripping means for said lever, comprising a fluid tight chamber in which said fuse is adapted to be disposed, means for regulating the pressure in said chamber, a stop member for limiting the movement of said lever when tripped by said pressure responsive means to prevent release of said detonating means, and means for resetting said lever whereby successive tests of said tripping means may be made without removing said fuse from said chamber.

14. A testing apparatus for a barometric fuse of the type having latched detonating means, a releasable lever therefor and pressure responsive tripping means for said lever, comprising a fluid tight chamber in which said fuse is adapted to be disposed, means for regulating the pressure in said chamber, a stop member for limiting the movement of said lever when tripped by said pressure responsive means to prevent release of said detonating means, means associated with said stop member for indicating when said lever is tripped, and means for resetting said lever without removing said fuse from said chamber.

ELMER H. BEISER.
ERNEST L. BERNINGER.
MAX E. SCHLENKER.